(12) United States Patent
Miller

(10) Patent No.: US 8,827,223 B2
(45) Date of Patent: Sep. 9, 2014

(54) UNIVERSAL RAIL MOUNTING SYSTEM

(76) Inventor: Michael G. Miller, Vancouver, WA (US)

( * ) Notice: Subject to any disclaimer, the term of this patent is extended or adjusted under 35 U.S.C. 154(b) by 345 days.

(21) Appl. No.: 13/358,364

(22) Filed: Jan. 25, 2012

(65) Prior Publication Data

US 2012/0187064 A1   Jul. 26, 2012

Related U.S. Application Data

(60) Provisional application No. 61/436,168, filed on Jan. 25, 2011.

(51) Int. Cl.
*A47B 96/06* (2006.01)
*A47G 29/00* (2006.01)
*A47K 1/00* (2006.01)
*E04G 3/00* (2006.01)
*E04G 5/06* (2006.01)

(52) U.S. Cl.
USPC ............... 248/214; 248/298.1; 248/309.1; 43/15

(58) Field of Classification Search
CPC ........ F16M 13/00; B63B 21/04; B63B 21/00; F41G 11/003; F41G 1/387; F41G 1/00
USPC ........... 248/177.1, 214, 220.21, 298.1, 309.1; 43/15, 21.2
See application file for complete search history.

(56) References Cited

U.S. PATENT DOCUMENTS

| | | | | |
|---|---|---|---|---|
| 3,515,549 A | * | 6/1970 | Bixby | 430/41 |
| 3,877,166 A | * | 4/1975 | Ward | 42/127 |
| 5,546,881 A | * | 8/1996 | Frederiksen | 114/112 |
| 5,680,725 A | * | 10/1997 | Bell | 42/127 |

* cited by examiner

*Primary Examiner* — Amy J Sterling
(74) *Attorney, Agent, or Firm* — Rylander & Associates PC; Mark E. Beatty; Kurt M. Rylander

(57) ABSTRACT

A universal mounting system includes a mounting rail and plurality of heavy mounting blocks and clip-on mounting blocks to receive utility adaptors. The mounting rail comprises a flange and a bearing rail, an open centerline channel extending the length of the mounting rail, the bearing rail having a first bearing surface distal from the flange and opposed second and third bearing surfaces disposed laterally along the length of the bearing rail, wherein the base width is less than the exterior bearing surface width. The heavy mounting blocks are slidingly couplable over the bearing rail, including a mounting surface to mate to the utility adaptor and a receiving channel having cross section conforming to the bearing rail cross section; a clamping member with a friction clamping member to go against the threaded rod distal end and bearing rail. The system includes a centerline channel depth not greater than the flange depth.

9 Claims, 16 Drawing Sheets

UNIVERSAL RAIL MOUNTING SYSTEM

CROSS-REFERENCE TO RELATED APPLICATIONS

This Application is a nonprovisional application of, and claims priority to, U.S. Provisional Patent Application Ser. No. 61/436,168, filed Jan. 25, 2011, which is hereby incorporated by reference.

FIELD OF THE INVENTION

The present invention relates to universal rail mounting systems, and especially for use on boats and vehicles.

BACKGROUND

Fishing from small boats has many advantages, not least of which are the ability to carry a group of people with more equipment than operating on foot and the ability to troll the fishing lines. Boat operators often install holders or hooks along the gunwales to receive a fishing rod or to hang boxes holding gear, bait or other items. Generally these holders require drilling into the boat's gunwale or rail structure to fasten in place, then sealing the fastener penetrations. Once mounted they cannot be moved, and so are not very flexible for accommodating variable numbers of people or differing equipment for different types of fishing or other outings.

A better solution is to provide a longitudinal rail mounted to a gunwale, railing or wall, and then mounting equipment to the rail, to give more flexibility. Mounting holders on rails is known, but existing devices still have many drawbacks. They are either clip on systems which cannot support significant torque, or they are complex to mount, and heavy. Excessive weight along the gunwales of a small boat can be very destabilizing and dangerous. Fishing rod holders are subjected to significant torque during trolling or from large sport fish. Tackle box holders are torqued by the weight of the gear which is amplified by the vertical movement of the boat through rough water. Additionally, existing mounting systems are generally single purpose, designed for holding fishing rods, or designed for holding tackle, or designed for holding personal items such as cups, but not interchangeable. Mounted equipment holders are also notoriously difficult to maintain and clean. Salt and dirt will rapidly seize up complicated mounting systems, and corrosion renders them unsightly. Of course, an additional concern is aesthetic. Boaters and fishermen are a prideful and boasting lot, so any solution should provide a clean and attractive look with an unobtrusive profile.

Fixed holders require mounting many extras around the boat to provide flexibility, by attempting to predict the most useful spots for any number of people and activities—especially so for charter boats which must cope with a variety of scenarios in numbers, skill levels, and types of equipment. Extra mounts means more penetrations in the boat structure, more maintenance, more opportunities for snagging other equipment or passengers, and more potential for injuries. Allowing a charter boat operator to easily reconfigure the layout on the fly provides for a more pleasurable customer experience, and allows the crew to ensure safe operating conditions at all times.

Additional safety and convenience considerations come into play as well. A boat operator may need to locate people at selected positions around the boat to prevent unbalanced conditions, requiring the ability to easily and securely reconfigure the type and location of fishing rod holders, utility hooks, and convenience items such as cup holders or cell phone holders. When sport fishing it may be necessary to move a rod or other equipment to a different location entirely after a large fish is hooked during the fight to reel it in.

Additionally, as boats and other vehicles come in all shapes and sizes, a mounting rail system should be mountable along either the top of surface of the gunwale or railing or along the side, or along a deck or vertical wall, and still accommodate the same wide range of equipment, so that a single system can be adapted to any number of boat configurations.

Thus, there is a need for a universal rail mounting system that is: (i) clip-on; (ii) strong; (iii) provides flexibility in mounting locations; (iv) can receive a variety of holders and devices; (v) is simple and easy to maintain and clean; (vi) provides for rapid repositioning; (vii) provides a clean, aesthetically pleasing look; (viii) can be mounted along the top or the side of a gunwale; (ix) can accommodate some curvature in arrangement; (X) adaptable to a variety of connector styles.

SUMMARY AND ADVANTAGES

A universal mounting system includes an elongated mounting rail and a heavy mounting block adapted to receive a utility adaptor, the mounting rail extending from a first end to a second end and comprising a flange portion and a bearing rail, the flange portion having opposed mirror-image first and second lateral flange wings extending the length of the mounting rail, the first and second lateral flange wings each including a flat mating surface and an opposed top surface, the distance from the mating surface to the top surface defining the flange depth; and, an open centerline channel disposed between the first and second lateral flange wings and extending the length of the mounting rail; and, the bearing rail coupled to the flange portion distal from the mating surface and extending the length of the mounting rail, the bearing rail having a first bearing surface distal from the flange portion mating surface and extending in width from a first lateral shoulder to an opposed second lateral shoulder; and, opposed second and third bearing surfaces, each of the second and third bearing surfaces disposed laterally along and extending the length of the mounting rail, each of the second and third bearing surfaces further extending from the respective first or second lateral shoulder to a respective first or second interior lateral shoulder proximate the flange portion, the distance between the first and second interior lateral shoulders defining a base width, and wherein the base width is less than the exterior bearing surface width; the heavy mounting block selectively couplable over the bearing rail, the heavy mounting block comprising a mounting surface to mate to the utility adaptor and a receiving channel extending from a first end to a second end, the receiving channel cross section conforming to the bearing rail cross section and having first, second and third interior bearing surfaces corresponding to the bearing rail first, second and third bearing surfaces; a clamping member cavity recessed into the mounting block first interior bearing surface proximate the receiving channel first end, the clamping member cavity to receive a friction clamping member; a threaded compression member having a handle and a threaded rod extending therefrom to a distal end; a threaded guide to engage the threaded rod within the clamping member cavity, the threaded guide disposed, a friction clamping member insertable into the clamping member cavity over the threaded guide to go against the threaded rod distal end.

A universal mounting system may include wherein the friction clamping member being u-shaped and having opposed first and second tabs connected by a bridge, the bridge having a contact surface to engage against the bearing rail first bearing surface; and, the clamping member cavity further including a center recess to receive the threaded guide, and opposed parallel first and second side channels straddling the center recess to receive the friction clamping member first and second tabs, respectively, the first side channel disposed toward the receiving channel first end, and the second side channel disposed toward the receiving channel second end.

A universal mounting system may include wherein the open centerline channel having a depth not greater than the flange depth.

A universal mounting system may include a clip-on mounting block, the clip-on mounting block to receive a utility adaptor, the clip-on mounting block comprising; a mounting surface to receive the clip-on utility adaptor and a receiving channel extending from a first end to a second end, the receiving channel having first and second interior bearing surfaces disposed to engage the bearing rail first bearing surface and one of the second or third bearing rail bearing surface and corresponding first or second lateral shoulder, and a snap lip opposed to the second interior bearing surface, the snap lip to removably engage the bearing rail over the lateral shoulder not engaged by the first and second interior bearing surfaces.

A universal mounting system may include a plurality of heavy mounting blocks.

A universal mounting system may include a utility adaptor coupled to the heavy mounting block, the utility adaptor to receive any one of a group of apparatus including a fishing rod, a trolling rod, a pole net and a boat hook.

A universal mounting system may include a utility adaptor coupled to the heavy mounting block, the utility adaptor to receive an articulated fishing rod holder.

A universal mounting system may include wherein the bearing rail first second and third bearing surfaces comprise a dovetail cross section.

The universal mounting system as described herein has many advantages over existing mounting systems, such as: (i) flexibility in configuration; (i) providing rapid clip-on attachment anywhere along the rail; (ii) high strength; (iii) flexibility in mounting locations; (iv) ability to receive a variety of holders and devices; (v) being simple and easy to maintain and clean; (vi) providing for rapid repositioning; (vii) providing a clean, aesthetically pleasing look; (viii) mountable along the top or the side of a gunwale, bulkheads, or decks; (ix) able to accommodate some curvature in arrangement; (x) adaptable to a variety of connector styles.

BRIEF DESCRIPTION OF THE DRAWINGS

The accompanying drawings, which are incorporated into and constitute a part of this specification, illustrate one or more embodiments of the present, invention and, together with the detailed description, serve to explain the principles and implementations of the invention.

DRAWING REFERENCE NUMBERS

Figure 1:
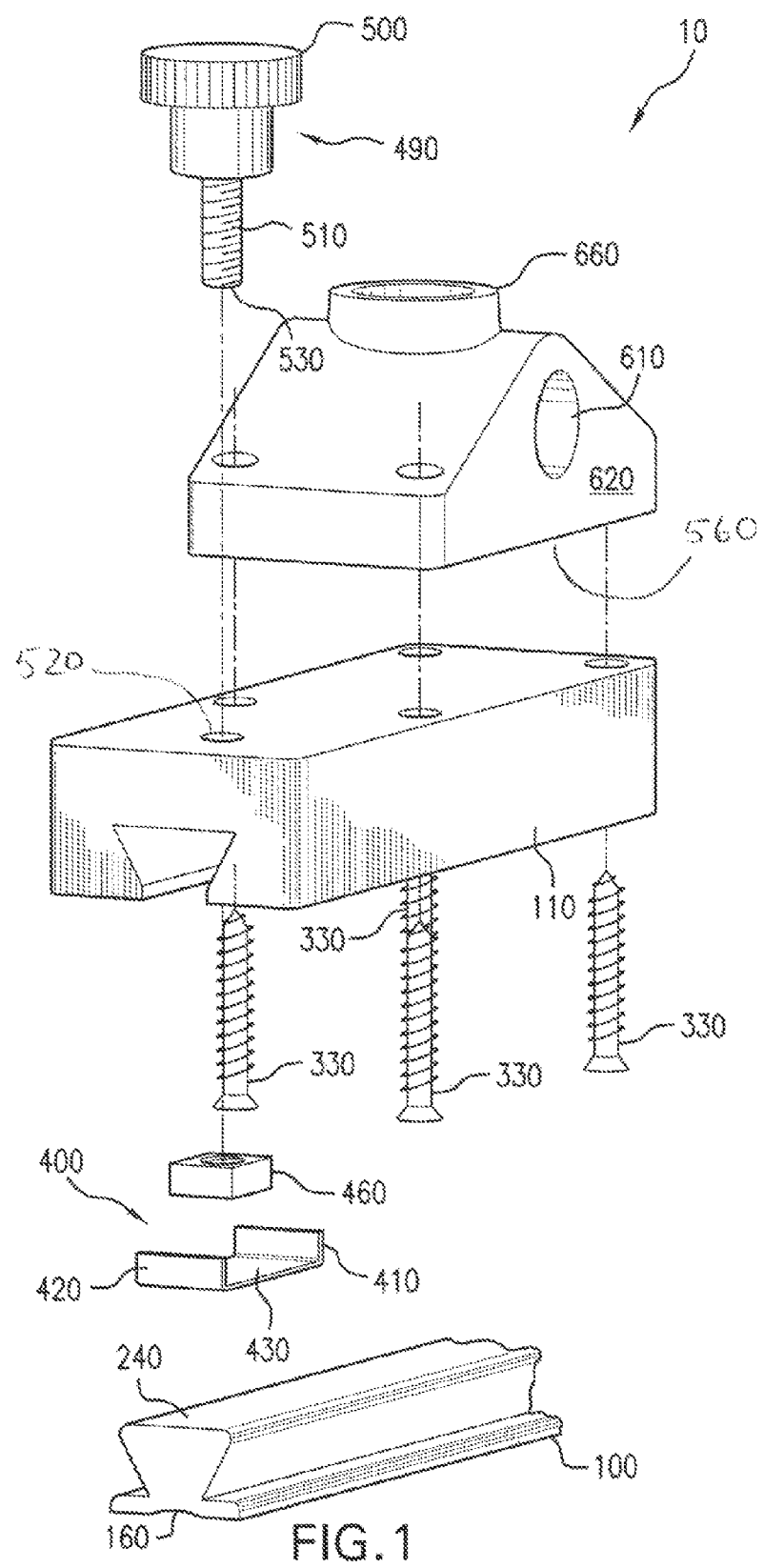
FIG. 1 shows an exploded view of a universal rail mounting system.
Figure 2:
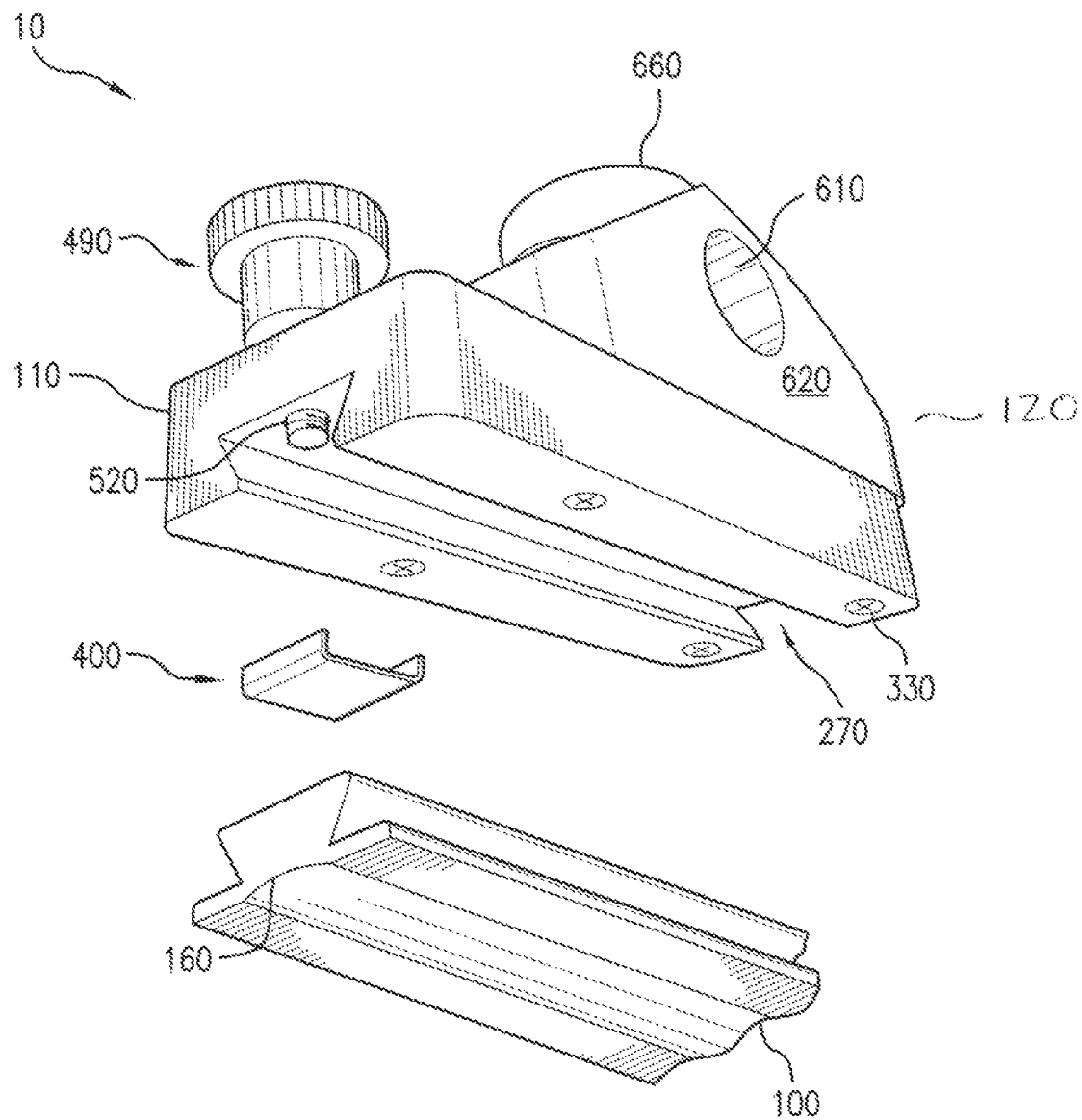
FIG. 2 shows bottom perspective partially exploded view of a universal rail mounting system.
Figure 3:
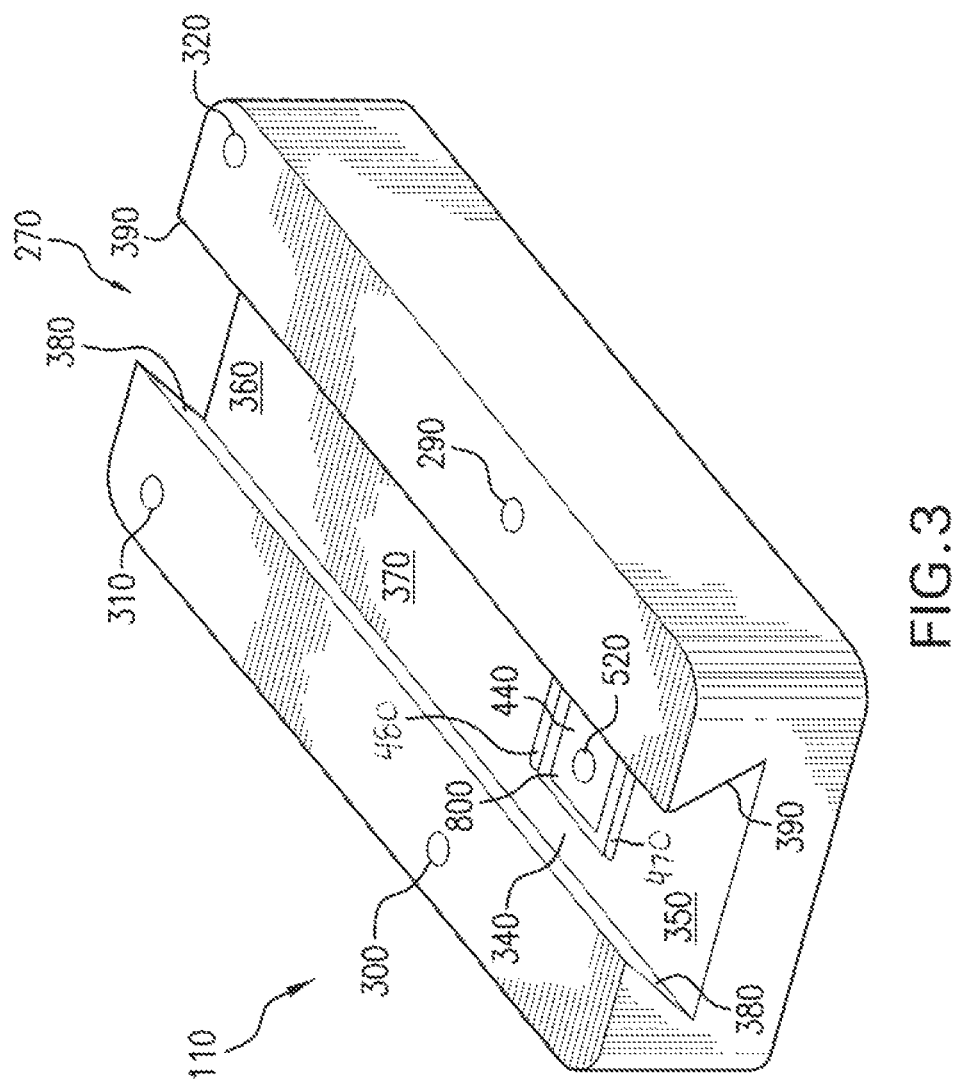
FIG. 3 shows a bottom perspective view of a heavy mounting block.
Figure 4:
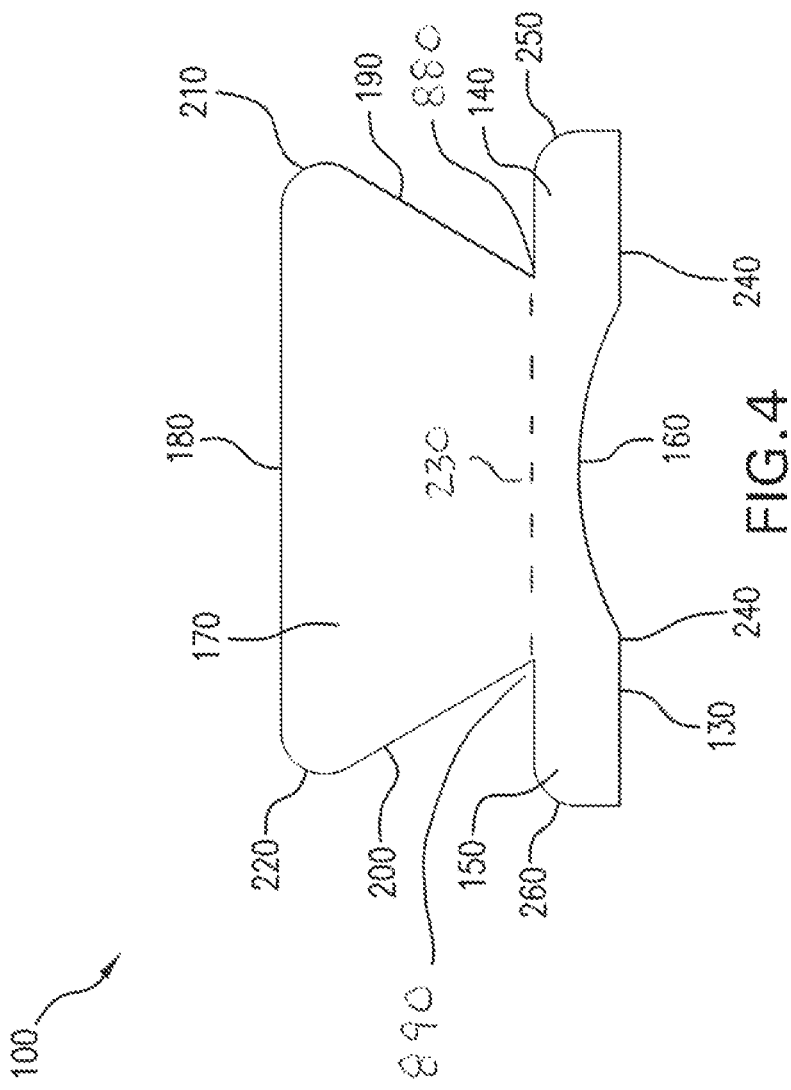
FIG. 4 shows cross sectional view of a mounting rail.
Figure 5:
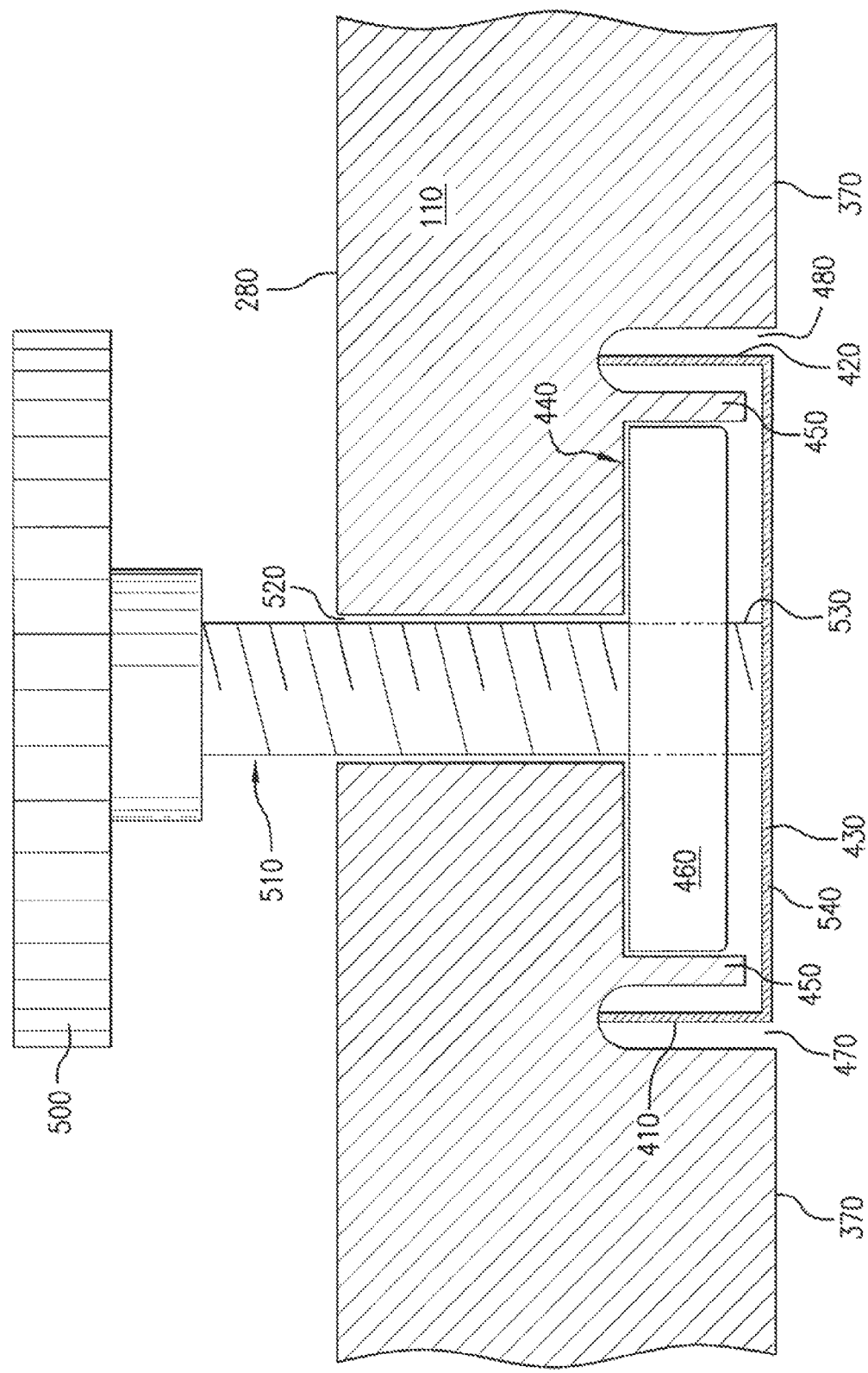
FIG. 5 shows a cutaway view of a heavy mounting block clamp.
Figure 6:
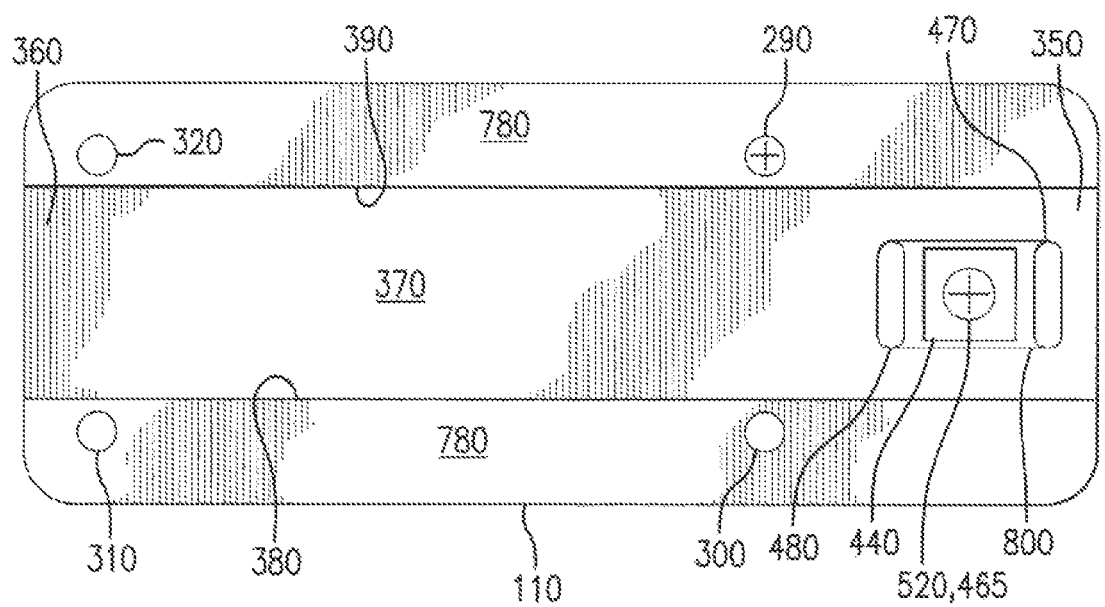
FIG. 6 shows a bottom view of a heavy mounting block.
Figure 7:
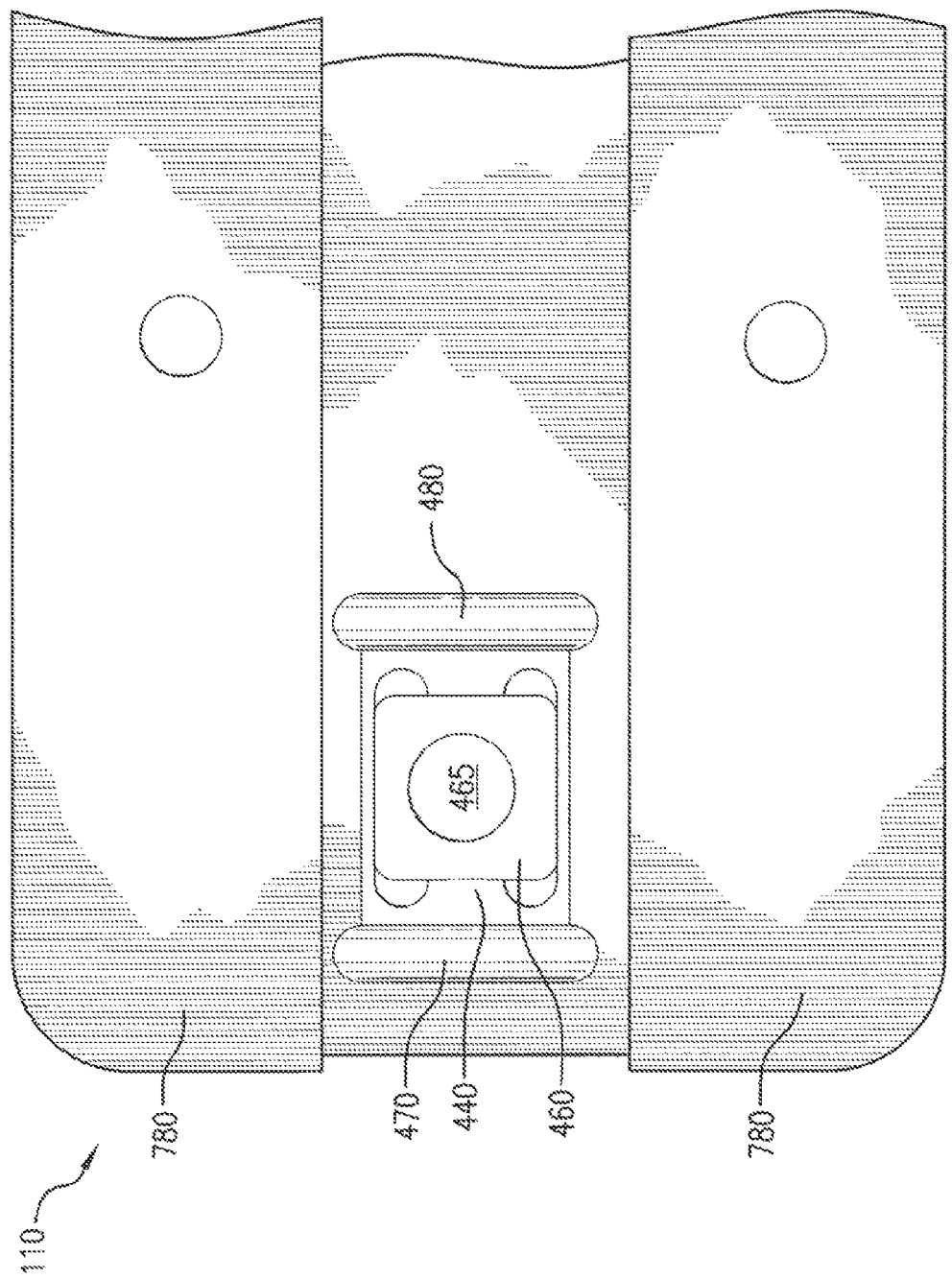
FIG. 7 shows a bottom close up view of a heavy mounting block.
Figure 8:
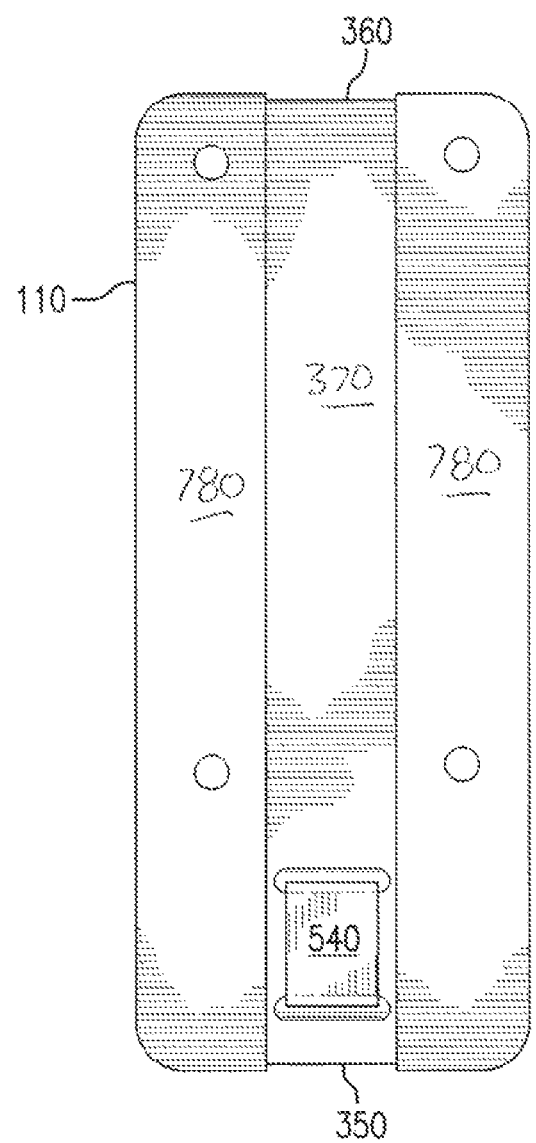
FIG. 8 shows a partially disassembled view of a heavy mounting block with clamp friction member inserted.
Figure 9:
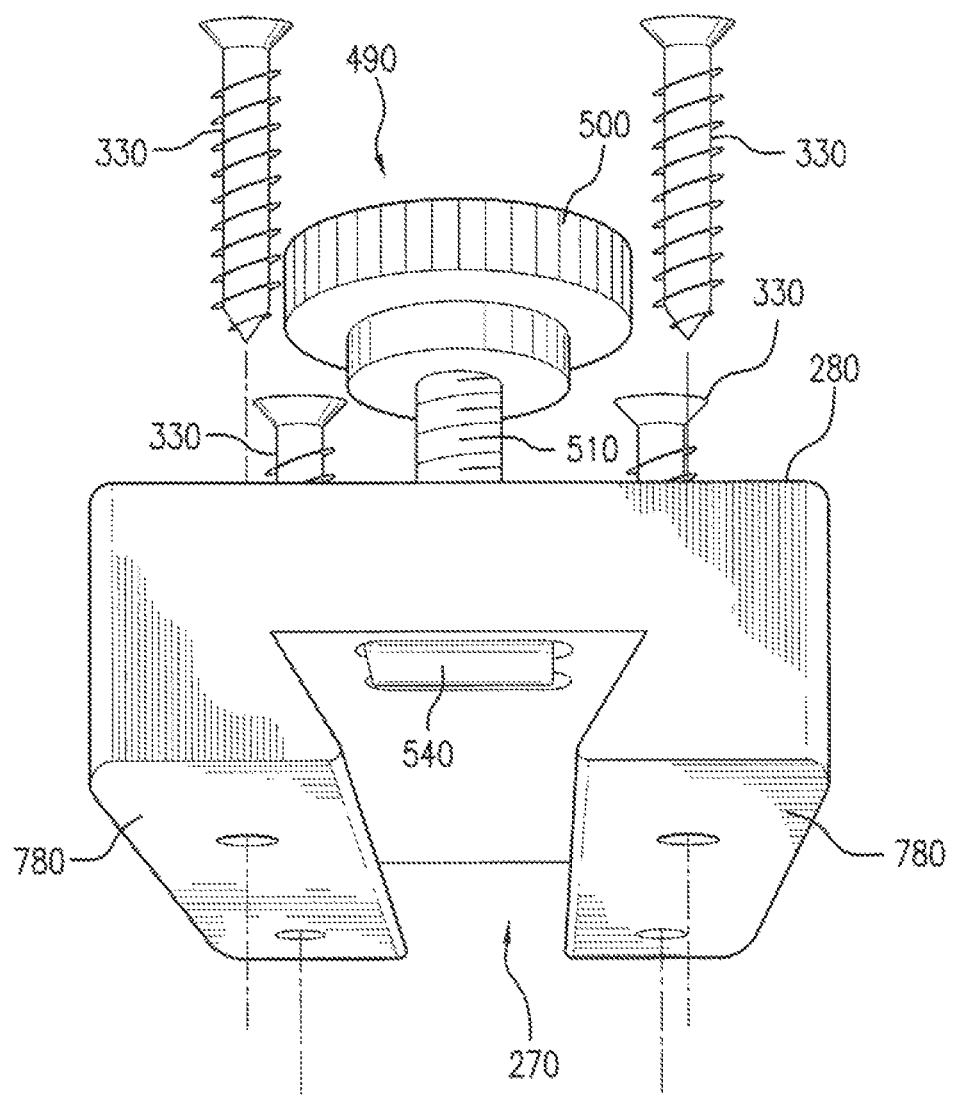
FIG. 9 shows an end view of a heavy mounting block with clamp friction member installed, but without a utility adaptor installed.
Figure 10:
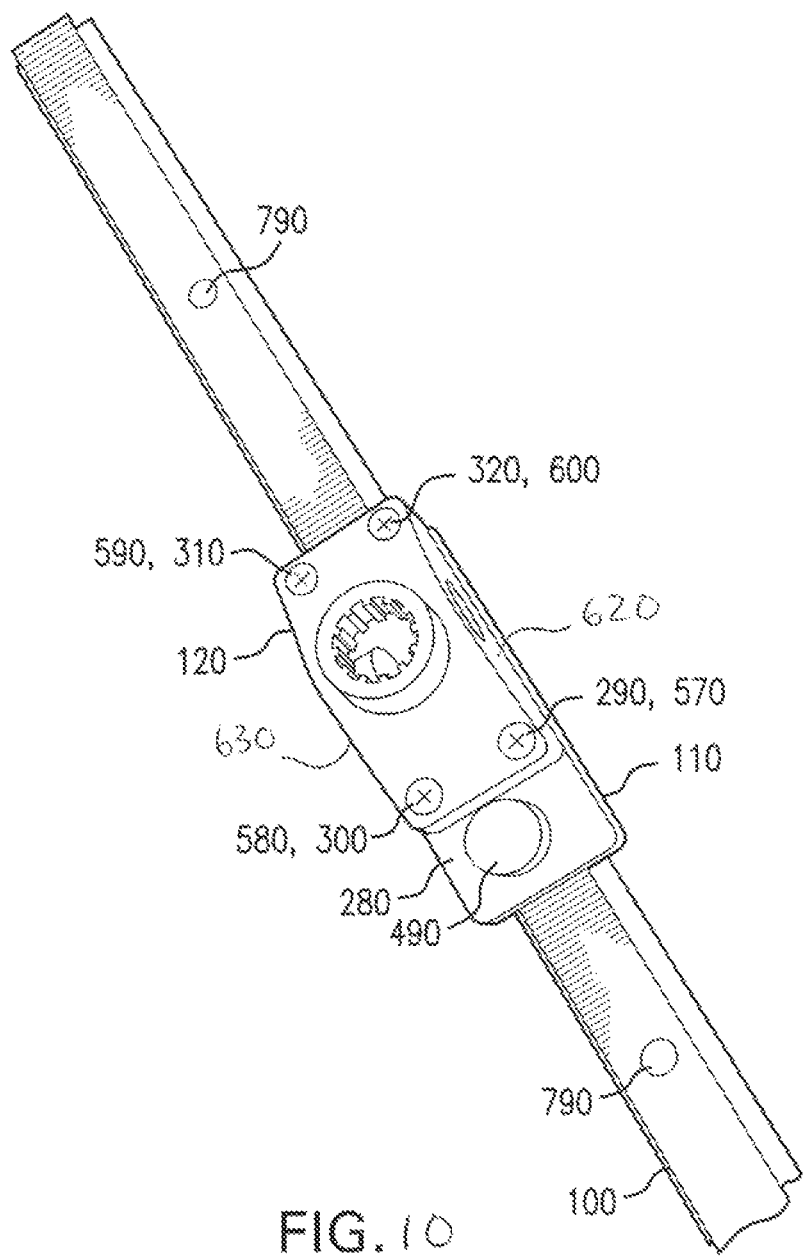
FIG. 10 shows a plan view of a universal rail mounting system with a heavy mounting block installed and a utility adaptor adapted to receive a rod apparatus in either vertical or horizontal planes.
Figure 11:
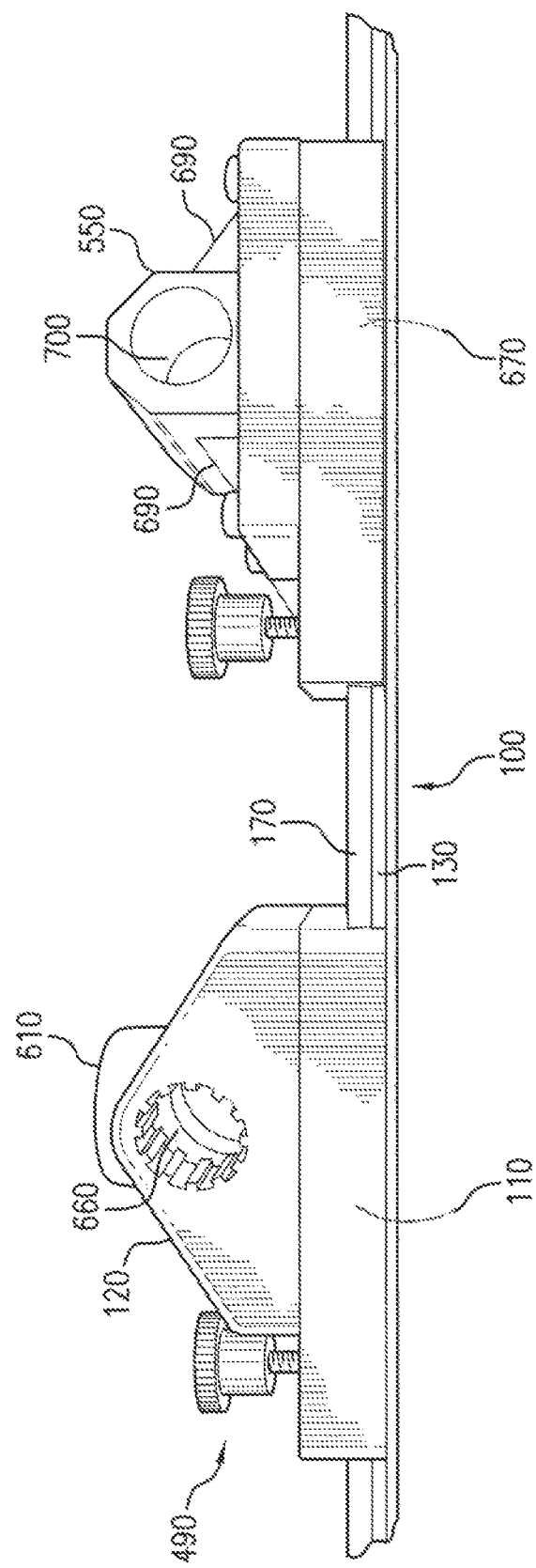
FIG. 11 shows a side view of a universal rail mounting system with two heavy mounting blocks and utility adapters installed, a first utility adapter and a second utility adapter to receive an articulated fishing rod holder.
Figure 12:
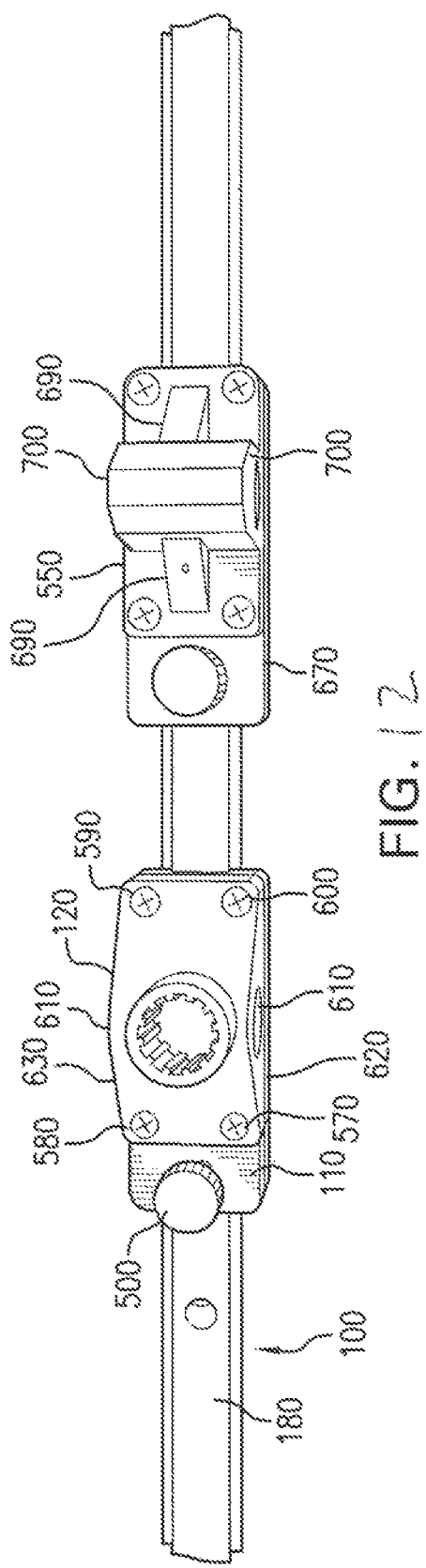
FIG. 12 shows a plan view of a universal rail mounting system with two heavy mounting blocks and utility adapters installed, a first utility adapter and a second utility adapter.

The following list of drawing reference numbers is provided for convenience only.
10 Universal rail mounting system
100 Mounting Rail
110 Heavy mounting block
120 First utility adapter
130 Flange portion
140 First lateral flange wing
150 Second lateral flange wing
160 Open centerline channel
170 Bearing rail portion
180 Bearing rail first bearing surface
190 Bearing rail second bearing surface
200 Bearing rail third bearing surface
210 First lateral shoulder
220 Second lateral shoulder
230 Bearing rail base
240 Flange mating surface
250 First lateral flange wing exposed corner
260 Second lateral flange wing exposed corner
270 Receiving channel
280 Heavy mounting block mounting surface
290 Utility adaptor mounting hole
300 Utility adaptor mounting hole
310 Utility adaptor mounting hole
320 Utility adaptor mounting hole
330 Utility adaptor mounting fasteners
340 Clamp portion.
350 Receiving channel first end
360 Receiving channel second end
370 Receiving channel first interior bearing surface
380 Receiving second interior bearing surface
390 Receiving third interior bearing surface
400 Friction clamping member
410 First tab
420 Second tab
430 Bridge 440 Center recess
450 Center recess sidewalls
460 Threaded guide
465 Threaded guide receiving hole
470 First side channel.
480 Second side channel
490 Compression member
500 Compression member handle
510 Threaded rod
520 Compression member receiving hole
530 Threaded rod distal end
540 Friction member contact surface
550 Second utility adaptor, adapted to receive an articulated fishing rod holder.
560 First utility adaptor mating surface
570 First utility adaptor mounting hole
580 First utility adaptor mounting hole
590 First utility adaptor mounting hole
600 First utility adaptor mounting hole
610 First utility adaptor first receiving channel
620 First utility adaptor first lateral side
630 First utility adaptor second lateral side
640 Articulated rod holder
650 Articulated rod holder base
660 First utility adaptor second receiving channel
670 Second heavy mounting block
680 <not used>
690 Finger clamps
700 Second utility adaptor receiving channel
710 Utility adaptor adapted as a cup holder
720 Cup retaining portion
730 First clip-on mounting block
740 Clip-on mounting block, receiving channel
750 Clip-on mounting block receiving channel second interior bearing surface
760 Snap lip
770 Second clip-on mounting block
780 First heavy mounting block second surface
790 Mounting rail fastener holes
800 Clamp member cavity
810 Clip-on mounting block receiving channel first interior bearing surface
820 Clip-on mounting block mounting surface
830 Clip-on mounting block back side
840 Clip-on mounting block top side
850 Clip-on mounting block bottom side
860 First lateral flange wing top surface
870 Second lateral flange wing top surface
880 Bearing rail first lateral interior shoulder
890 Bearing rail second lateral interior shoulder
900 Mounting rail first end.
910 Mounting rail second end

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIGS. 1-16 demonstrate both the utilitarian features of the system, as well as the aesthetic design features of the system.

In the description, reference to a "gunwale" is intended to exemplary of the various horizontal and vertical mounting surfaces found on a boat or other vehicle or structure, and is not intended as a limitation.

Referring to FIGS. 1-16, a universal rail mounting system 10 includes an elongated mounting rail 100 and a heavy mounting block 110 adapted to receive a utility adaptor 120, the mounting rail 100 extending from a first end 900 to a second end 910 and comprising a flange portion 130 and a bearing rail 170, the flange portion 130 having opposed mirror-image first and second lateral flange wings 140, 150, extending the length of the mounting rail 100, the first and second lateral flange wings 140 and 150 each including a flat mating surface 240 and an opposed top surface 860 and 870, respectively, the distance from the mating surface 240 to the top surfaces 860, 870 defining the flange depth; and, an open centerline Channel 160 disposed between the first and second lateral flange wings 140, 150, and extending the length of the mounting rail 100; and, the bearing rail 170 coupled to the flange portion 130 distal from the mating surface 240 and extending the length of the mounting rail 100, the bearing rail 170 having a first bearing surface 180 distal from the flange portion mating surface 240 and extending in width from a first lateral shoulder 210 to an opposed second lateral shoulder 220; and, opposed second and third bearing surfaces, 190 and 200, respectively, each of the second and third bearing surfaces 190, 200, disposed laterally along and extending the length of the mounting rail 100, each of the second and third bearing surfaces 190, 200, further extending from the respective first or second lateral shoulder 210, 220, to a respective first or second interior lateral shoulder 880 and 890, respectively, proximate the flange portion 130, the distance between the first and second interior lateral shoulders 880 and 890 defining a base width, and wherein the base width is less than the exterior bearing surface width; the heavy mounting block 110 selectively slidingly couplable over the bearing rail 170, the heavy mounting block 110 comprising a mounting surface 280 to mate to the utility adaptor 120 and a receiving channel 270 extending from a first end 350 to a second end 360, the receiving channel cross section conforming to the bearing rail cross section and having first, second and third interior bearing surfaces 370, 380 and 390, respectively, corresponding to the bearing rail first, second and third bearing surfaces 180, 190 and 200, respectively; a clamping member cavity 800 recessed into the mounting block first interior bearing surface 180 proximate the receiving channel first end 350, the clamping member cavity 800 to receive a friction clamping member 400; a threaded compression member 490 having a handle 500 and a threaded rod 510 extending therefrom to a distal end 530; a threaded guide 460 to engage the threaded rod 510 within the clamping member cavity 800, and the friction clamping member 400 insertable into the clamping member cavity 800 over the threaded guide 460 to go against the threaded rod distal end 530.

A universal mounting system 10 may include the friction clamping member 400 being u-shaped and having opposed first and second tabs 410 and 420 connected by a bridge 430, the bridge 430 having a contact surface 540 to engage against the bearing rail first bearing surface 180; and, the clamping member cavity 800 further including a center recess 440 to receive the threaded guide 460, and opposed parallel first and second side channels 470 and 480, respectively, straddling the center recess 440 to receive the friction clamping member first and second tabs, 410, 420, respectively, the first side channel 470 disposed toward the receiving channel first end 350, and the second side channel 480 disposed toward the receiving channel second end 360.

A universal mounting system 10 may include wherein the open centerline channel 160 has a depth not greater than the flange depth.

A universal mounting system 10 may include a clip-on mounting block 730, the clip-on mounting block 730 to receive a utility adaptor 710, the clip-on mounting block 730 comprising; a mounting surface 820 to receive a clip-on utility adaptor 710 and a receiving channel 740 extending from a first end to a second end, the receiving channel having first and second interior bearing surfaces 810 and 750, respectively, disposed to engage the bearing rail first bearing surface 180 and one of the second or third bearing rail bearing surface 190 or 200, and corresponding first or second lateral shoulder 210 or 220, and a snap lip 760 opposed to the second interior bearing surface 750, the snap lip 760 to removably engage the bearing rail 170 over the lateral shoulder 190 or 200 not engaged by the first and second interior bearing surfaces 810 and 750.

A universal mounting system 10 may include a plurality of heavy mounting blocks 110, 670.

A universal mounting system 10 may include a utility adaptor 120 or 700 coupled to the heavy mounting block 110 or 670, the utility adaptor to receive any one of a group of apparatus including a fishing rod, a trolling rod, a pole net a boat hook, or similar items.

A universal mounting system 10 may include a utility adaptor 670 coupled to the heavy mounting block 110, the utility adaptor to receive an articulated fishing rod holder 640.

A universal mounting system 10 may include wherein the bearing rail first second and third bearing surfaces, 180, 190 and 200, comprise a dovetail cross section.

Referring again to FIGS. 1-16, a universal rail, mounting system 10 includes an elongated mounting rail 100 mountable to a boat gunwale or similar structure, and at least one heavy mounting block 110 slidingly mountable onto mounting rail 100 and configured to receive a first utility adapter 120. Utility adapters may be adapted to perform any number of tasks and may take a number of forms, but preferably are configured to couple to a heavy mounting block 110 or clip-on mounting block 730 without modification.

In the embodiment, mounting rail 100 includes a bearing rail 170 and flange portion 130 projecting from the narrow portion of bearing rail 170. Bearing rail 170 includes a first bearing surface 180 spanning between first and second lateral shoulders 210 and 220, respectively, and includes bearing rail second and third bearing surfaces 190 and 200, respectively. Bearing rail 170 narrows from its widest region at first and second lateral shoulders 210, 220, inwardly to its narrowest portion at bearing rail base 230. Lateral shoulders 210, 220 are radiused to prevent, sharp edges cutting into heavy mounting block 110 or lines passing over mounting rail 100. First and second lateral flange wings 140 and 150, respectively, project from bearing rail base 230, providing stability and a mating surface 240 for mating to a gunwale surface. Open centerline channel 160 extends longitudinally the length of mounting rail 100 along mating surface 240, providing a drain path for water that that may seep between mating surface 240 and the gunwale. Additionally, open centerline channel 160 provides expansion space in the event, trapped water freezes, to prevent separating mounting rail 100 from the gunwale, which could allow leakage at connection points. First and second lateral flange wings 140, 150 include radiused exposed corners 250 and 260, respectively, to prevent cutting lines which may pass over. In the embodiment mounting rail 100 is made from extruded and anodized aluminum to provide strength, stiffness, light weight, abrasion and corrosion resistance, while still allowing mounting rail 100 to be bent to conform to curved surfaces.

Heavy mounting block 110 includes receiving channel 270 extending from first end 350 to second end 360 for receiving bearing rail 170, mounting surface 280 for receiving a utility adaptor 120 or other equipment, an opposed second surface 780, a plurality of utility adapter mounting holes 290, 300, 310 and 320 extending through block 110 to receive fasteners 330 to rigidly mount first utility adapter 120 to block 110, and clamp portion 340. The cross section of receiving channel 270 approximately matches the cross section of rail bearing rail 170 in order to receive bearing rail 170 snuggly and without, excessive play. Receiving channel 270 includes first interior bearing surface 370 to go against bearing rail first bearing surface 180, and second and third interior bearing surfaces 380 and 390 to go against bearing rail second and third bearing surfaces 190 and 200, respectively. However, block 110 is symmetrical and may therefore be mounted in reverse orientation without hindrance. Block 110 and receiving channel 270 are dimensioned to provide an air gap between second surface 780 and lateral flange wings 140 and 150, as well as between second surface 780 and the surface to which mounting rail 100 is mounted, to provide clearance and drainage in the embodiment, second surface 780 is roughened or knurled, which helps prevent water from being siphoned or wicked into the gap. In the embodiment, block 110 is made from high strength plastic material with lower hardness value than aluminum so that wear on bearing surfaces preferentially accumulates on block 110, which is more easily replaceable and will not impact the structure of a boat.

Clamp portion 340 includes clamping member cavity 800 proximal to channel first end 350 to receive friction clamping member 400. Friction member 400 comprises a thin metallic strip formed into a u-shape, with first and second tabs 410 and 420 extending from bridge 430. Clamping member cavity 800 includes center recess 440 with surrounding sidewalls 450 to receive threaded guide 460 and engage threaded guide sides 480, preventing threaded guide 460 from rotating. Threaded guide 460 includes threaded receiving hole 465 to engage threaded rod 510.

In the embodiment, friction clamping member 400 is insertable within clamping member cavity 800 over compression member threaded rod end 530 and loosely held within clamping member cavity 800, such that the friction clamping member 400 has at least a small range of movement within cavity 800.

Compression member 490 includes a handle 500 and threaded rod 510 extending therefrom to distal end 530 and insertable through compression member receiving hole 520 in block 110 to engage threaded guide 460. In the embodiment, opposing first and second side channels 470 and 480, respectively, are provided to receive tabs 410, 420, such that bridge 430 spans threaded guide 460 when inserted and is contacted by distal end 530, and such that the bends of tabs 410 and 420 are presented normal to first bearing surface 180 rather than the edges, for smoother operation. In the embodiment, bridge 430 is larger than mounting rail fastener holes 790, to prevent becoming snagged. Bridge 430 includes bearing contact surface 540 for contacting first bearing surface 180. Compression member 490 operates to move friction member 400 between a disengaged position, wherein contact surface 540 lays within cavity 800 either below or flush with channel first interior bearing surface 370, and an engaged position, wherein contact surface 540 displaces outwardly to contact and compress against bearing rail first bearing surface 180 to prevent movement of block 110 along mounting rail 100. Friction member 400 serves several purposes by distributing the pressure from threaded rod 510 over a larger area to prevent damage to first bearing surface 180 and providing an inexpensive and easily replaceable wear surface. In the embodiment, friction member 400 is made from polished aluminum or stainless steel to provide a relatively tough, wear and corrosion resistant friction surface which can be easily replaced when worn, rather than having to replace block 110 in its entirety, thereby saving money over the long term. Preferably, friction member 400 is of a material that will resist galvanic corrosion when in wet contact with mounting rail 100 and threaded rod 510. Friction member 400 may include snap-in retaining lips to prevent it from falling out of cavity 800 when block 110 is removed from mounting rail 100. In the embodiment, the length of threaded rod 510 is selected to provide compression against friction member 400, but to limit the strain imposed on the sidewalls 380 and 390 of receiving channel 270 if threaded rod 510 is fully tightened.

Utility adaptor 120 mates to block 110 to provide a mounting apparatus for a fishing rod or other gear. In the embodiment first utility adaptor 120 and second utility adaptor 550 are configured to receive the base of a fishing rod holder or similar device. Alternatively, one or more utility adaptors could be configured to mount a pole net, boat hook, tackle box or a hook for stowing lines or other gear. Block 110 provides a universal standardized base for mounting a variety of equipment to mounting rail 100.

In the embodiment, first utility adaptor 120 includes a substantially flat mating surface 560 to go against heavy mounting block mounting surface 280 and a plurality of mounting holes 570, 580, 590 and 600, corresponding in layout to utility adaptor mounting holes 290, 300, 310 and 320, for receiving utility adaptor mounting fasteners 330. Utility adaptor mounting holes 290-320 are routed out proximal to block second surface 780 in order to recess the heads of fasteners 330 for a flush appearance and to prevent the fasteners from backing out. Alternatively, fasteners 330 may be threaded from second surface 280 outward to prevent backing out, as shown in FIG. 1. In the embodiment, first utility adaptor 120 includes a first receiving channel 610 extending through utility adaptor 550 from a first lateral side 620 to an opposing second lateral side 630 and sized to receive the base 650 of an articulated rod holder 640. First receiving channel 610 extends entirely through first utility adaptor 550 in order to provide drainage and to accommodate equipment with longer base attachments, fishing rods directly, or other equipment, without the danger of being yanked out. First utility adaptor 120 includes a second receiving channel 660 approximately normal to mating surface 560 and intersecting first receiving channel 610, thereby providing the ability to mount mounting rail 100 either along the top surface or the side surface of a gunwale or similar structure, while utility adapter 120 allows a mounted pole to remain substantially vertically. First or second receiving channels 610 and 660 may include grommets or threaded compression fittings to more firmly grip equipment mounted in the utility adaptor.

Referring to FIGS. 11-14, a second heavy mounting block 670 with a second utility adaptor 550, adapted to receive an articulated fishing rod holder, is shown mounted to mounting rail 100 Second utility adaptor 550 includes finger clamps 690 to assist in retaining articulated rod holder base 650 within a receiving channel 700.

Figure 13:
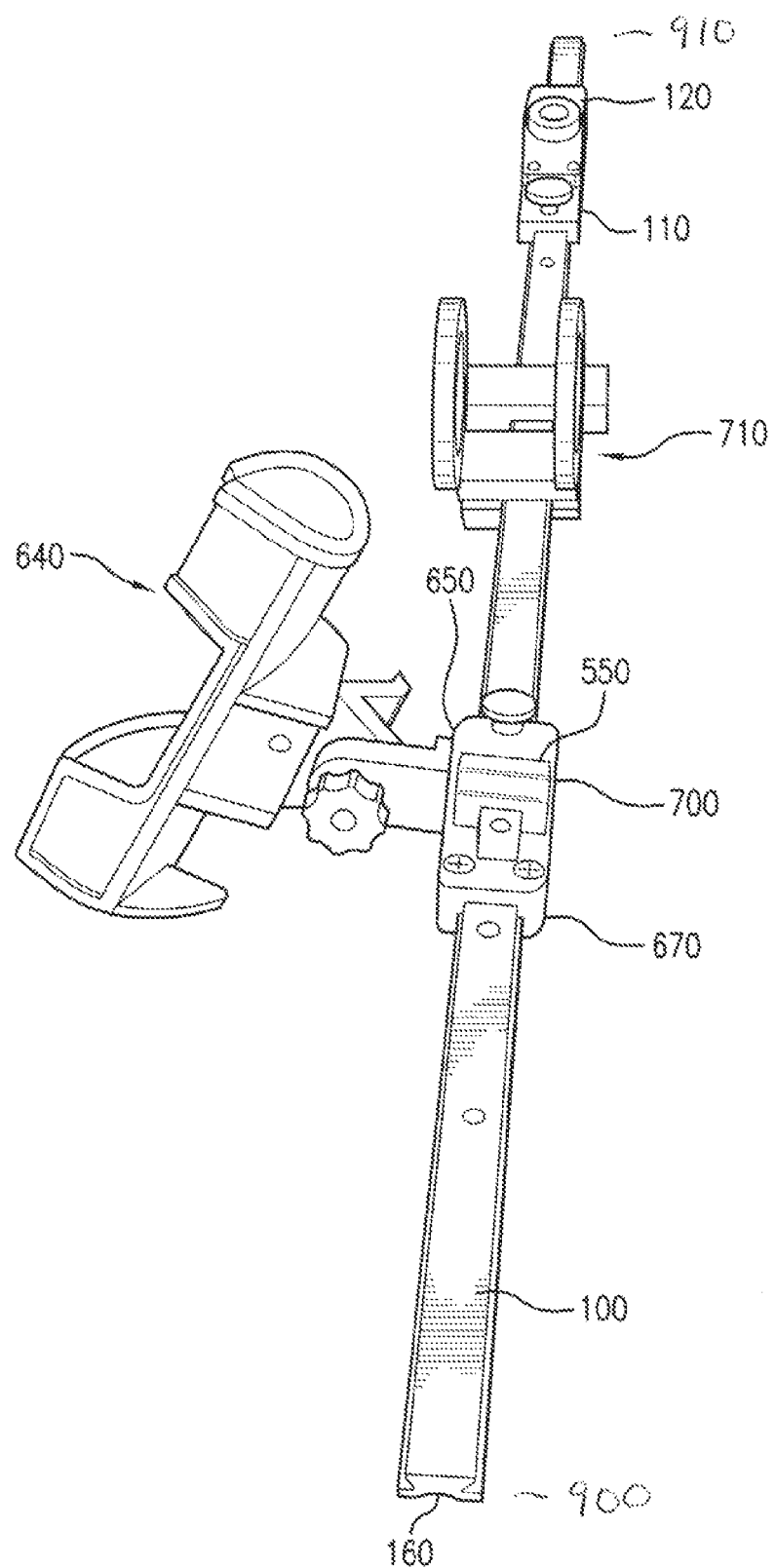
FIG. 13 shows a perspective view of a universal rail, mounting system with two heavy mounting blocks installed, with utility adapters, and a clip-on mounting block with a utility adapter adapted to receive a beverage cup.
Figure 14:
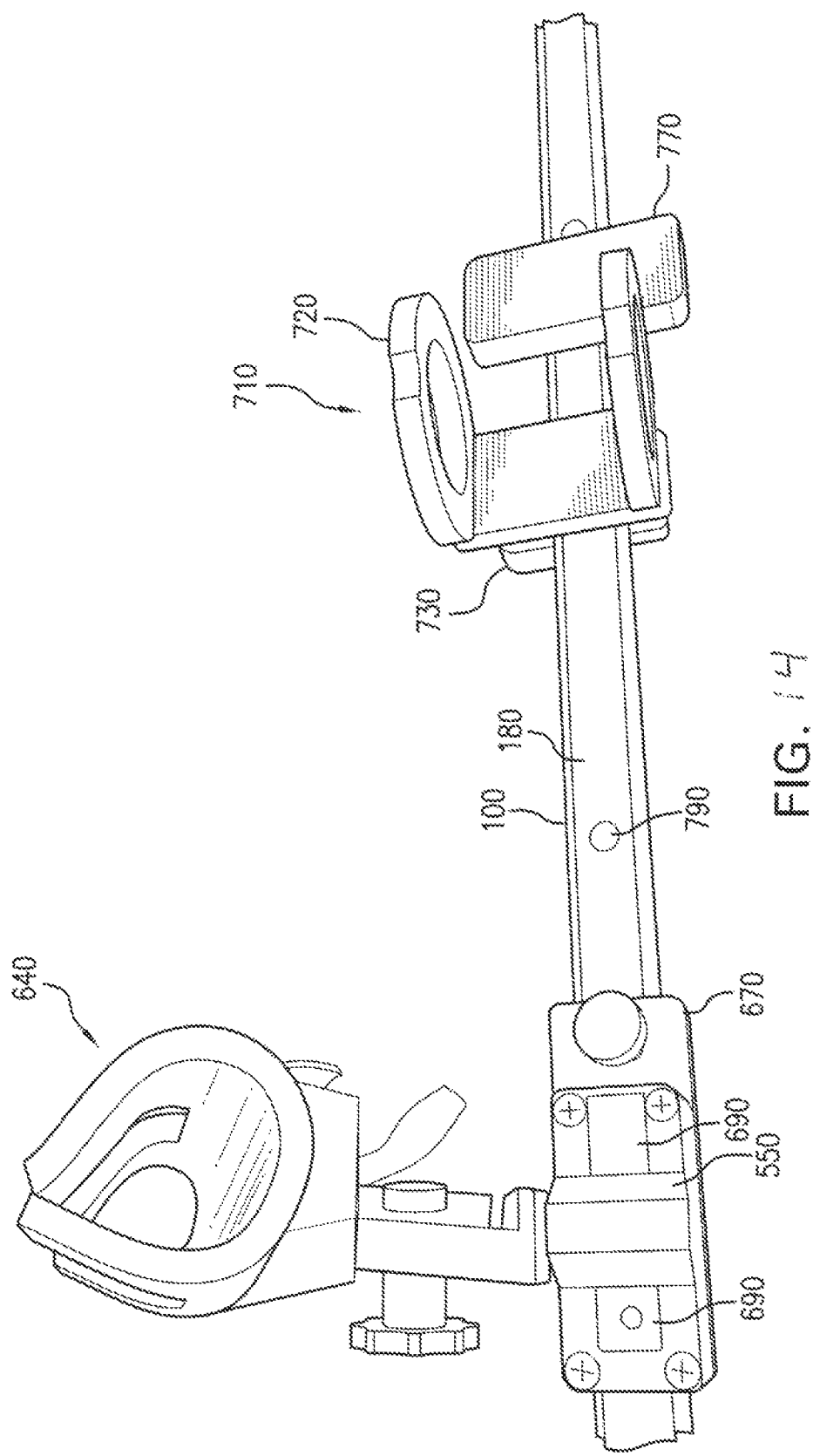
FIG. 14 shows a view of a universal rail mounting system including a heavy mounting block with a utility adapter installed, a first clip-on mounting block with a utility adapter installed, and a second clip-on mounting block with no utility adapter installed.
Figure 15:
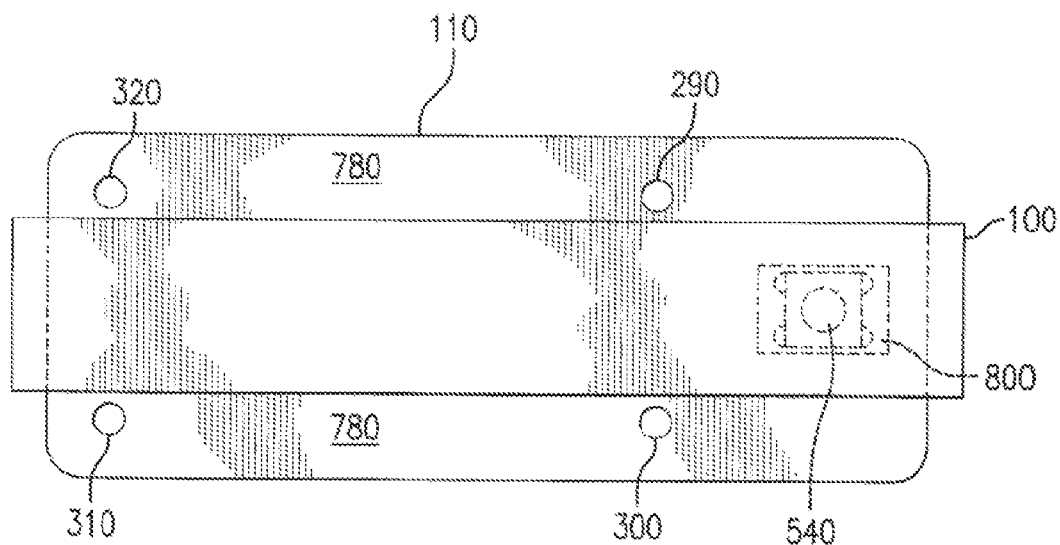
FIG. 15 shows a bottom plan view of a heavy mounting block mounted on a mounting rail.
Figure 16:
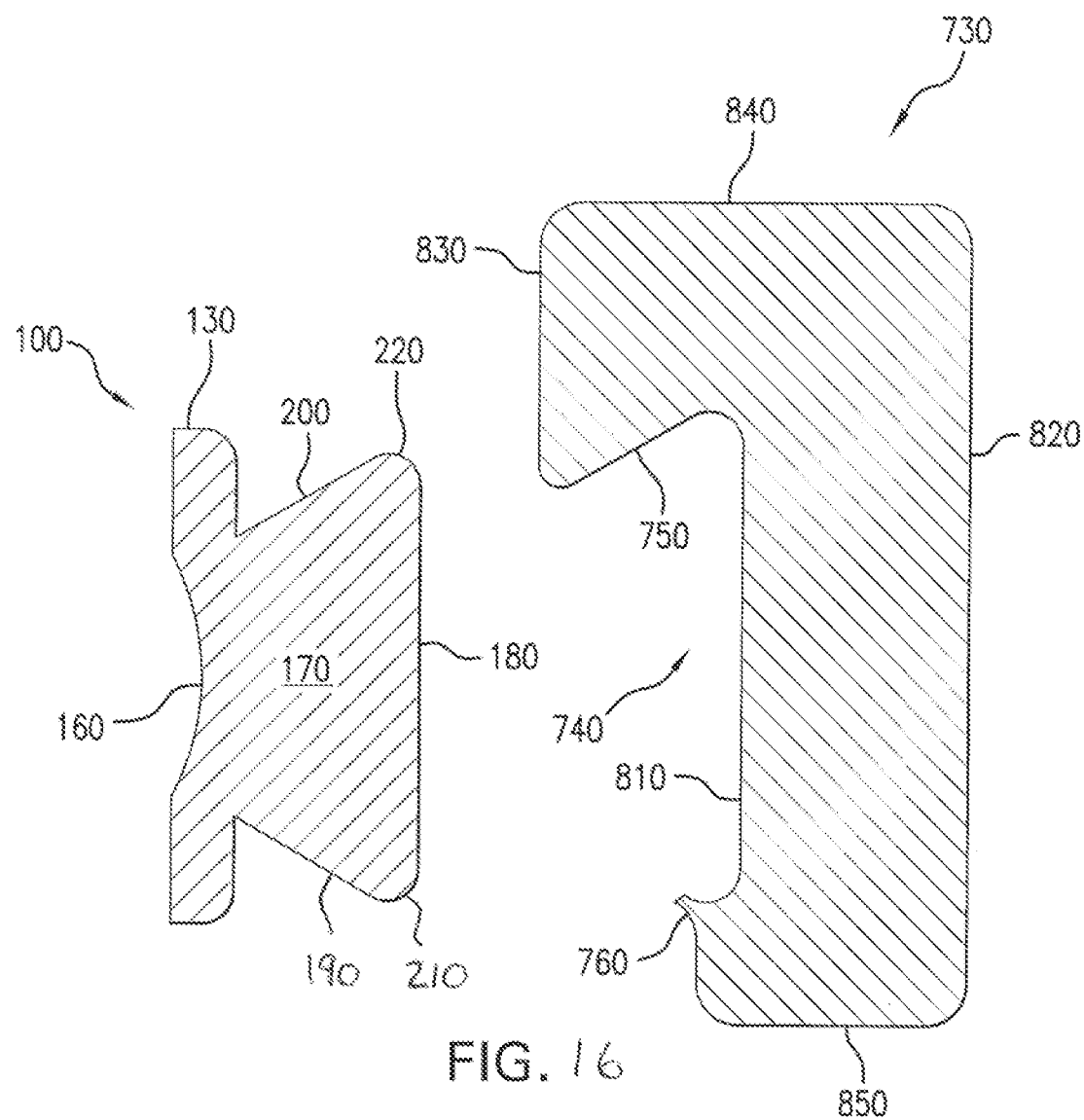
FIG. 16 shows an end cross-section view of a clip-on mounting block with a mounting rail.

Referring to FIGS. 13-14 and 16, a utility adapter 710 configured as a cup holder is provided having a cup retaining portion 720 removably coupled to a clip-on mounting block 730. Clip-on mounting block 730 includes a receiving channel 740 with a first internal, bearing surface 810 which engages against bearing rail first bearing surface 180, a second internal bearing surface 750 which engages against either the second or third bearing rail bearing surface, 190 or 200, and its corresponding lateral shoulder 210 or 220, respectively, and snap lip 760 opposing receiving channel internal bearing surface 750, to snap over the bearing surface and lateral shoulder not engaged by receiving channel internal bearing surfaces 750 and 810. Clip-on mounting block 730 includes a mounting surface 820 to receive a utility adaptor, a top surface 840 and opposed bottom surface 850, the bottom surface 850 proximate snap lip 760, and a backside surface 830 opposed mounting surface 820. In this regard, clip-on mounting block 730 has a top and bottom, because snap lip 760 protrudes sufficiently to enclose a lateral shoulder 210 or 220, but not to fully engage against a bearing rail bearing surface 190 or 200. This is in contrast to a heavy mounting block 110, which is essentially symmetrical and may be mounted in any orientation. Additionally, snap lip 760 is thin enough to be only semi-rigid so that it may deform while being pushed over a lateral shoulder 210 or 220, but spring-returning to its original shape. The specific dimensions of snap lip 760 will depend on the strength and rigidity of the particular material used, which a person in the art may easily determine.

Clip-on mounting block 730 allows a utility adapter 710 to be installed and removed without having to remove other, heavier duty equipment. Cup holders, tackle boxes and similar items designed to hold deadweight or hanging loads, which are not subjected to torque which may pull them over the top (as a fishing rod being yanked by a fish) may be snapped on without need for the additional channel interior bearing surface, so operators may conveniently position or reposition drinks, cell phone holders or other items immediately adjacent their station at any time or location along the mounting rail 100.

Referring to FIG. 14, an additional clip-on mounting block 770 is shown without a utility adaptor installed.

In operation, mounting rail 100 is first rigidly mounted onto a gunwale top, bottom or side surface, or similar surface such as a deck or vertical wall. A utility adaptor, for example 120 or 640, is selected and mounted rigidly to a heavy mounting block 110. Heavy mounting block 110 is then inserted onto bearing rail 170 using receiving channel 270, slid along bearing rail 170 to the desired location, and clamped in place by rotating threaded compression member 490 to engage friction member 400 against rail first bearing surface 180. Clip-on mounting blocks, for example 730 or 770, may be snapped in place next to a movable block, and may also be slid along mounting rail 100 for optimal adjustment. Any number and mix of heavy mounting blocks and clip-on mounting blocks may be installed, arranged, and rearranged to accommodate the instant needs of a boat operator. Utility adaptors using front-mounted fasteners, as shown in FIG. 14 with second utility adaptor 690, may be changed out without having to remove the movable block from the mounting rail 100.

Those skilled in the art will recognize that numerous modifications and changes may be made to the preferred embodiment without departing from the scope of the claimed invention will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An apparatus, comprising an elongated mounting rail and a heavy mounting block adapted to receive a utility adaptor,
   the mounting rail extending from a first end to a second end and comprising a flange portion and a bearing rail,
      the flange portion having:
         opposed mirror-image first and second lateral flange wings extending the length of the mounting rail, the first and second lateral flange wings each including a flat mating surface and an opposed top surface, the distance from the mating surface to the top surface defining the flange depth; and,
         an open centerline channel disposed between the first and second lateral flange wings and extending the length of the mounting rail; and,
      the bearing rail coupled to the flange portion distal from the mating surface and extending the length of the mounting rail, the bearing rail having:
         a first bearing surface distal from the flange portion mating surface and extending in width from a first lateral shoulder to an opposed second lateral shoulder; and,
         opposed second and third bearing surfaces, each of the second and third bearing surfaces disposed laterally along and extending the length of the mounting rail, each of the second and third bearing surfaces further extending from the respective first or second lateral shoulder to a respective first or second interior lateral shoulder proximate the flange portion, the distance between the first and second interior lateral shoulders defining a base width, and wherein the base width is less than the exterior bearing surface width;
   the heavy mounting block selectively slidingly couplable over the bearing rail, the heavy mounting block comprising:
      a mounting surface to mate to the utility adaptor and a receiving channel extending from a first end to a second end, the receiving channel cross section conforming to the bearing rail cross section and having first, second and third interior bearing surfaces corresponding to the bearing rail first, second and third bearing surfaces;
      a clamping member cavity recessed into the mounting block first interior bearing surface proximate the receiving channel first end, the clamping member cavity to receive a friction clamping member;
      a threaded compression member having a handle and a threaded rod extending therefrom to a distal end;
      a threaded guide to engage the threaded rod within the clamping member cavity,
      a friction clamping member insertable into the clamping member cavity over the threaded guide to go against the threaded rod distal end and the bearing rail first bearing surface, the friction clamping member being u-shaped and having opposed first and second tabs connected by a bridge, the bridge having a contact surface to engage against the bearing rail first bearing surface;
      the clamping member cavity further including a center recess to receive the threaded guide, and opposed parallel first and second side channels straddling the center recess to receive the friction clamping member first and second tabs, respectively, the first side channel disposed toward the receiving channel first end, and the second side channel disposed toward the receiving channel second end.

2. An apparatus comprising:
   a heavy mounting block adapted to selectively slidingly couple to a mounting rail, the mounting rail extending from a first end to a second end and comprising a flange portion having a mating surface and a bearing rail, the bearing rail coupled to the flange portion distal from the mating surface and extending the length of the mounting rail, the bearing rail having:
      a first bearing surface distal from the flange portion mating surface and extending in width from a first lateral shoulder to an opposed second lateral shoulder; and,
      opposed second and third bearing surfaces, each of the second and third bearing surfaces disposed laterally along and extending the length of the mounting rail, each of the second and third bearing surfaces further extending from the respective first or second lateral shoulder to a respective first or second interior lateral shoulder proximate the flange portion, the distance between the first and second interior lateral shoulders defining a base width, and wherein the base width is less than the exterior bearing surface width;
   the heavy mounting block comprising:
      a mounting surface to mate to the utility adaptor and a receiving channel extending from a first end to a second end, the receiving channel cross section conforming to the bearing rail cross section and having first, second and third interior bearing surfaces corresponding to the bearing rail first, second and third bearing surfaces;
      a clamping member cavity recessed into the mounting block first interior bearing surface proximate the receiving channel first end, the clamping member cavity to receive a friction clamping member;
      a threaded compression member having a handle and a threaded rod extending therefrom to a distal end;
      a threaded guide to engage the threaded rod within the clamping member cavity,
      a friction clamping member insertable into the clamping member cavity over the threaded guide to go against the threaded rod distal end and the bearing rail first bearing surface, the friction clamping member being u-shaped and having opposed first and second tabs connected by a bridge, the bridge having a contact surface to engage against the bearing rail first bearing surface;
      the clamping member cavity further including a center recess to receive the threaded guide, and opposed parallel first and second side channels straddling the center recess to receive the friction clamping member first and second tabs, respectively, the first side channel disposed toward the receiving channel first end, and the second side channel disposed toward the receiving channel second end.

3. An apparatus as in claim 1, further comprising:
the open centerline channel having a depth not greater than the flange depth.

4. An apparatus comprising an elongated mounting rail and a heavy mounting block adapted to receive a utility adaptor:
the mounting rail extending from a first end to a second end and comprising a flange portion and a bearing rail,
the flange portion having:
opposed mirror-image first and second lateral flange wings extending the length of the mounting rail, the first and second lateral flange wings each including a flat mating surface and an opposed top surface, the distance from the mating surface to the top surface defining the flange depth; and,
the bearing rail coupled to the flange portion distal from the mating surface and extending the length of the mounting rail, the bearing rail having:
a first bearing surface distal from the flange portion mating surface and extending in width from a first lateral shoulder to an opposed second lateral shoulder; and,
opposed second and third bearing surfaces, each of the second and third bearing surfaces disposed laterally along and extending the length of the mounting rail, each of the second and third bearing surfaces further extending from the respective first or second lateral shoulder to a respective first or second interior lateral shoulder proximate the flange portion, the distance between the first and second interior lateral shoulders defining a base width, and wherein the base width is less than the exterior bearing surface width;
the heavy mounting block selectively slidingly couplable over the bearing rail, the heavy mounting block comprising:
a mounting surface to mate to the utility adaptor and a receiving channel extending from a first end to a second end, the receiving channel cross section conforming to the bearing rail cross section and having first, second and third interior bearing surfaces corresponding to the bearing rail first, second and third bearing surfaces;
a clamping member cavity recessed into the mounting block first interior bearing surface proximate the receiving channel first end, the clamping member cavity to receive a friction clamping member;
a threaded compression member having a handle and a threaded rod extending therefrom to a distal end;
a threaded guide to engage the threaded rod within the clamping member cavity,
a friction clamping member insertable into the clamping member cavity over the threaded guide to go against the threaded rod distal end and the bearing rail first bearing surface;
a clip-on mounting block, the clip-on mounting block to receive a utility adaptor, the clip-on mounting block comprising;

a mounting surface to receive the clip-on utility adaptor and a receiving channel extending from a first end to a second end, the receiving channel having first and second interior bearing surfaces disposed to engage the bearing rail first bearing surface and one of the second or third bearing rail bearing surface and corresponding first or second lateral shoulder, and a snap lip opposed to the second interior bearing surface, the snap lip to removably engage the bearing rail over the lateral shoulder not engaged by the first and second interior bearing surfaces.

5. An apparatus as in claim 1, further comprising:
a plurality of heavy mounting blocks.

6. An apparatus as in claim 1, further comprising:
a utility adaptor coupled to the heavy mounting block, the utility adaptor to receive any one of a group of apparatus including a fishing rod, a trolling rod, a pole net and a boat hook.

7. An apparatus as in claim 1, further comprising:
a utility adaptor coupled to the heavy mounting block, the utility adaptor to receive an articulated fishing rod holder.

8. An apparatus as in claim 1, further comprising:
wherein the bearing rail first second and third bearing surfaces comprise a dovetail cross section.

9. An apparatus comprising a clip-on mounting block adapted to removably couple to a mounting rail,
the mounting rail extending from a first end to a second end and comprising a flange portion having a mating surface and a bearing rail, the bearing rail coupled to the flange portion distal from the mating surface and extending the length of the mounting rail, the bearing rail having:
a first bearing surface distal from the flange portion mating surface and extending in width from a first lateral shoulder to an opposed second lateral shoulder; and,
opposed second and third bearing surfaces, each of the second and third bearing surfaces disposed laterally along and extending the length of the mounting rail, each of the second and third bearing surfaces further extending from the respective first or second lateral shoulder to a respective first or second interior lateral shoulder proximate the flange portion, the distance between the first and second interior lateral shoulders defining a base width, and wherein the base width is less than the exterior bearing surface width;
the clip-on mounting block comprising a mounting surface to receive a utility adaptor and a receiving channel extending from a first end to a second end, the receiving channel having first and second interior bearing surfaces disposed to engage the bearing rail first bearing surface and one of the second or third bearing rail bearing surface and corresponding first or second lateral shoulder, and a snap lip opposed to the second interior bearing surface, the snap lip to removably engage the bearing rail over the lateral shoulder not engaged by the first and second interior bearing surfaces.

\* \* \* \* \*